April 10, 1962     F. H. ANDERSON     3,029,408
EXTENSION CORD CLAMP
Filed July 13, 1960
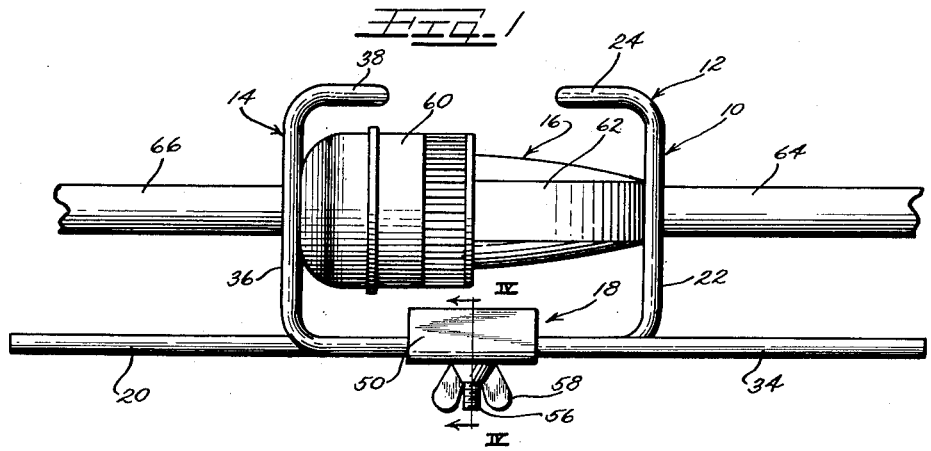
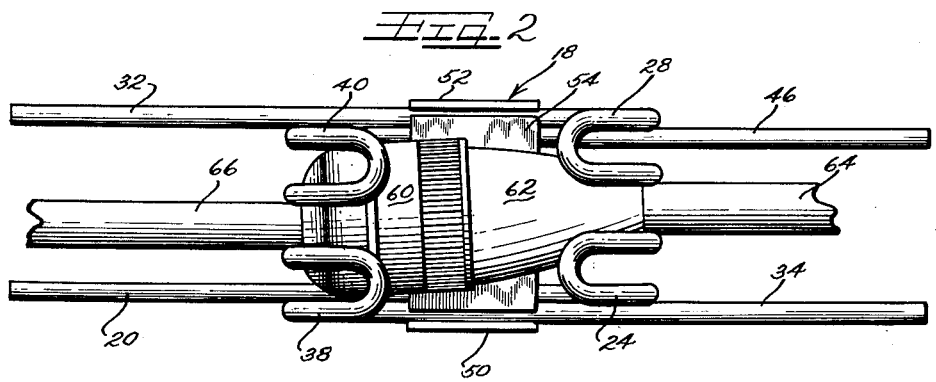
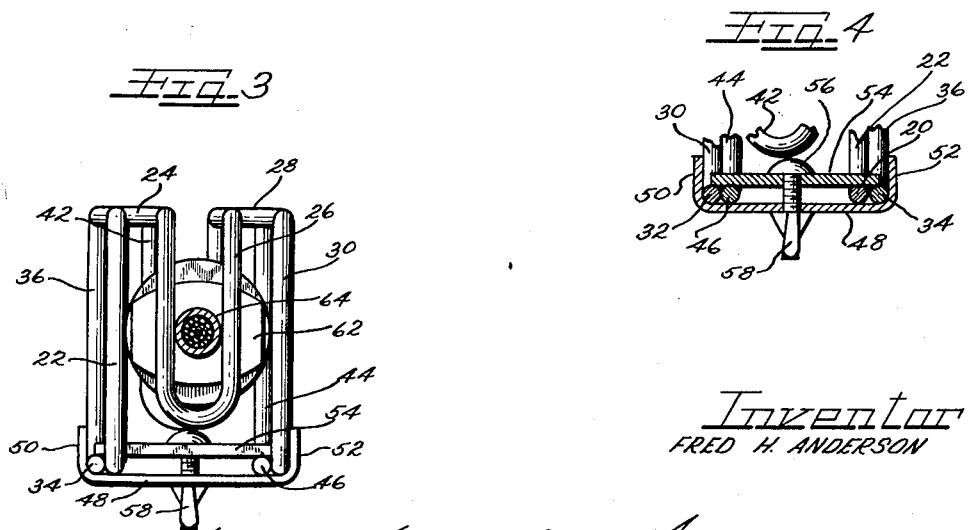
Inventor
FRED H. ANDERSON United States Patent Office 3,029,408
Patented Apr. 10, 1962

3,029,408
EXTENSION CORD CLAMP
Fred H. Anderson, 738 Waldine Ave., Chicago 13, Ill.
Filed July 13, 1960, Ser. No. 42,646
5 Claims. (Cl. 339—75)

This invention relates to an extension cord clamp, and more particularly to an extension cord clamp formed of two members of bent wire construction which cooperate with a channel-shaped clamp whereby to retain an extension cord coupling connection against inadvertent separation.

Heretofore, it has generally been necessary to rely on the inherent frictional connection between the respective elements of an extension cord coupling to prevent separation therebetween, although various expedients such as tying a string or other such material around the coupling elements have been attempted. Such expedients have been highly unsatisfactory, and in innumerable applications there has been a need for a reliable means of holding the coupling elements together, exemplary of which are vacuum cleaners, electric powered lawn mowers, industrial machinery and the like.

Accordingly, the present invention provides a pair of wire form members each forming a vertical U-shaped slot for receiving the cords for the respective coupling elements and having overlying spaced holding members and underlying adjustable extensions to prevent lateral movement of the coupling therefrom. The adjustable extensions are engaged by a channel-shaped clamp held in releasably clamping relationship thereto by a wing nut or the like, so that the device may be utilized with couplings of various dimensions and may hold the elements in assembled position without any hazard of inadvertent disconnection.

Accordingly, it is an object of the present invention to provide an extension cord clamp which is highly reliable and may be easily assembled and disassembled and adjusted to fit a variety of coupling sizes.

Another object of the invention is to provide an extension cord clamp as described which is of an unusually simple construction, preferably being formed of a pair of wire members suitably bent into a form for preventing either longitudinal or lateral displacement of the coupling from the clamp.

Another object of the invention is to provide a device as described which may be readily assembled by simply slipping the coupling into a recess defined by the wire members in an interfitting but horizontally displaced condition thereof and thereafter horizontally moving the wire members toward one another into engagement with the coupling and clamping them by the channel-shaped clamping means therefor.

Another object of the invention is to provide an extension cord clamp as described which is effective to resist substantial horizontal or longitudinal stress on the respective cord members for the coupling.

Other objects and advantages of the invention will become apparent as the description proceeds in accordance with the drawings in which:

FIGURE 1 is a side elevational view of an extension cord clamp according to the present invention;

FIGURE 2 is a top plane view of the structure shown in FIGURE 1;

FIGURE 3 is an end elevational view of the structure shown in FIGURES 1 and 2; and FIGURE 4 is a vertical sectional view, partially broken away, of the clamp for the extension cord clamp device of the invention and taken along the line IV—IV of FIGURE 1.

Referring now to the drawings, an extension cord clamp 10 is shown in accordance with the present invention having a pair of wire form members 12 and 14 for maintaining an extension cord coupling connection 16 against inadvertent separation. The clamp 10 of the invention may also be formed of sheet metal material or the like within the scope of the invention, but desirably, each of the members 12 and 14 is made from a single length of wire of relatively strong and rigid characteristics and which is bent to retain the coupling connection 16 as releasably secured by a clamp member 18. Thus the member 12 includes a linear guide extension 20 which is relatively elongated as hereinafter further described, and which is bent upwardly, preferably at a right angle, to provide a retention leg 22. The wire is bent inwardly at the upper end of the leg 22 and given a reverse turn to form a holding member 24 which extends in partially overlying parallel relationship to the extension 20. From the holding member 24, the wire extends downwardly for a predetermined distance which is preferably less than the length of the leg 22 and is given a second reverse turn so that it extends upwardly to provide a U-shaped wire-receiving member 26 which is open at its upper end. The wire is then turned inwardly in parallel relation with the holding member 24 to form a reverse turn and provide a second holding member 28. A second retention leg 30 extends downwardly from the holding member 28, and it will be seen that the legs 22 and 30 and the depending member 26 are disposed in co-planar relation to form a retention wall, also as hereinafter further described. The wire is then bent inwardly at right angles to the leg 30 to form an elongated linear extension 32 parallel with the leg 20 and preferably of similar length.

It will be appreciated that in forming the member 12, the three reverse turns for the holding member 24, the depending U-shaped member 26 and the holding member 28 may be formed initially. Thereupon the wire may be bent upwardly to define the legs 22 and 30 with the depending member 26 therebetween, which may be bent inwardly to form the holding members 24 and 28. Accordingly, only a very few bending operations will be required.

The member 14 is preferably formed in an identical manner, and it will be appreciated that the device is readily susceptible to mass production techniques. Thus a guide extension 34 is provided which is bent upwardly to provide a retention leg 36; and the wire is bent as previously described to form holding members 38 and 40 in parallel relation with each other and with the extension 34, with a depending member 42 between the holding members 38 and 40 having a U-shaped construction opening toward the top, as in the case of the U-shaped member 26. A second retention leg 44 extends downwardly from the holding member 40, and the wire is then bent inwardly to form an elongated linear extension 46 in parallel relationship to the extension 34 and preferably of similar length.

The legs 36 and 44 and the depending U-shaped member 42 are also disposed in parallel relationship to form a retention wall for the coupling connection 16, and it will be seen that the extensions 20 and 32 and the extensions 34 and 46 are spaced apart a similar distance so that they may cooperate with one another in providing tracks or guide means for assembling and disassembling the device as hereinafter further described.

The clamp 18 desirably includes a channel-shaped member 48 having preferably upstanding side walls 50 and 52 which are spaced apart a distance which is greater than the width of either of the members 12 and 14 by an amount which is approximately equal to the diameter of the wire from which the members 12 and 14 are formed. A clamping plate 54 is provided having a width slightly less than the distance between the upstanding members 50 and 52 and which cooperates with the bottom of the channel-shaped member 48 to adjustably hold the members 12 and 14 in clamping position by means of a bolt or the like 56 extending downwardly from the plate 54 through the channel-shaped member 48 and adapted to clamp the legs 20, 32 and 34, 46 by manually turning the wing nut 58. It will be noted, incidentally, that the head of the bolt 56 desirably is spaced somewhat below the depending members 26 and 42.

In assembling the device 10 for use in maintaining the coupling connections 16 against inadvertent separation, therefore, the members 12 and 14 are placed in the channel-shaped member 48 of the clamp 18 with the respective holding members 24 and 28 disposed in opposed inwardly extending relation to the corresponding holding member 38 and 40 and in adjustably spaced apart relationship thereto. Thus the respective extensions of the members 12 and 14 will be disposed in overlapping relationship at such time, as seen in the top plan view of FIGURE 2. It will be appreciated, of course, that the pair of extensions on one of the members 12 and 14 could be spaced apart by slightly less than the spacing of the extensions on the other of the members within the scope of the invention, so as to interfit therebetween, but in the form shown, one of the extensions of one of the members will fit within an adjacent extension of the other of the members while the other extension of the said one of the members will be disposed on the outside of the adjacent extension of the other of the members. As indicated previously, the identical construction of the members 12 and 14 facilitates manufacturing operations.

The extensions may be inserted in the channel-shaped member 48 either before or after the connection of the plate 54 thereto, and it will be seen that they are in mutually guiding or tracking relationship, and that their longitudinally adjustable movement is assisted by the upstanding flanges 50 and 52 and the plate 54 when the device is assembled. Thus the wing nut 58 will be loosened during the initial portions of the operation and the members 12 and 14 pulled apart longitudinally in guided relationship so that their respective holding members 24, 28 and 38, 40 are spaced apart a distance greater than the length of the coupling connection 16.

The coupling connection 16 may be of any standard construction, or otherwise, and may, for example, include a coupling element 60 having terminal recesses for mating engagement with the prongs of the coupling element 62 in accordance with the understanding of those skilled in the art.

When the coupling conection 16 is to be inserted into the extension cord clamp 10 of the invention, the extension lines 64 and 66 are inserted downwardly into the depending U-shaped members 26 and 42 respectively, with the individual holding members 24, 28 and 38, 40 being spaced apart for this purpose as described. The individual spaced apart members 24 and 28, and 38 and 40 may, if desired, be spaced from one another a distance approximating or even slightly less than the diameter of one of the extension lines 64 or 66, although it will be appreciated that variations in this construction may be made within the scope of the invention. The coupling connection 16 will thus move downwardly into the rectangular space defined by the members 12 and 14 as the extension lines 64 and 66 move downwardly into the U-shaped slots defined by the members 26 and 42. Thereupon, the members 12 and 14 may be telescoped toward one another as by placing the thumb against one of the members and the fingers on the other and pressing them together. They will thereby be brought into abutting engagement with the coupling connection 16, as shown in FIGURES 1 and 2. Thereupon, the wing nut 58 may be tightened to the extent desired to hold the coupling conection against separation, such as might otherwise result through tension forces exerted through the lines 64 and 66.

Disassembly of the device may be accomplished in substantially the reverse manner, by loosening the nut 58 and sliding the members 12 and 14 longitudinally apart so that the holding members thereon are spaced apart a distance greater than the longitudinal dimension of the coupling 16. The coupling member 16 may then be lifted from the device 10 with the extension lines 64 and 66 sliding readily upwardly in the U-shaped slots defined by the depending members 26 and 42; and, if desired, the clamp 18 may be tightened to hold the device in assembled condition and in readiness for its next use, although, of course, such tightening is a matter of preference.

The extensions 20, 32 and 34, 46 may have any length sufficient to accommodate slidable relatively outward movement of the members 12 and 14 for receiving coupling connections of any expected length. It may also be noted that, because of their identical construction, the members 12 and 14 may be nested for compact shipment or storage.

It will thus be seen hat a cord extension clamp has been provided which is of exceptionally simple and economical construction, and which may be assembled or disassembled without the use of special skills or techniques. Once assembled, the device wil maintain a coupling connection against all expectable tension forces which may be exerted thereon, and thereby provides a solution of the problem which has existed heretofore of having the operation of electrically powered equipment suddenly interrupted, possibly at a crucial moment. Accordingly, the device is suitable for use in a wide range of applications, and, in fact, wherever extension cords are used.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A cord extension coupling clamp comprising a pair of wire form members each having a pair of parallel extensions and an upstanding structure joining said extensions and defining an upwardly opening line-receiving slot, each of said upstanding structures having an upper holding portion extending into partially overlying, substantially parallel relationship to said extensions and clamping means releasably retaining the extensions of said members in adjustably mating, oppositely directed and co-planar relationship to dispose the holding members in adjustably spaced relation and facing one another whereby to releasably retain a coupling between said upstanding structures, said holding members and said extensions to prevent inadvertent disassembly thereof.

2. A cord extension coupling clamp comprising a pair of members each formed of a single length of wire bent to provide a pair of parallel, unidirectional extensions, a leg extending upwardly from each of the extensions, a reversely turned wire portion extending from the upper end of each leg into partially overlying, parallel relationship with said extensions, and a downwardly extending, U-shaped line-receiving member joining said reversely turned portions, and clamping means for releasably engaging the extensions of each of said members in oppositely directed, longitudinally adjustable relationship, to maintain said reversely turned portions in adjustably spaced relation facing one another, to receive a coupling therebetween and then to be moved into overlying holding relationship therewith, said downwardly extending members being adapted to engage opposite ends of the coupling to hold it against inadvertent separation.

3. A cord extension coupling clamp comprising a pair of members each formed of a single length of wire bent to provide a pair of parallel, unidirectional extensions, a leg extending upwardly from each of the extensions, a reversely turned wire portion extending from the upper end of each leg into partially overlying, parallel relationship with said extensions, and a downwardly extending, U-shaped line-receiving member joining said reversely turned portions, and clamping means for releasably engaging the extensions of each of said members in oppositely directed, longitudinally adjustable relationship, to maintain said reversely turned portions in adjustably spaced relation facing one another, to receive a coupling therebetween and then to be moved into overlying holding relationship therewith, said downwardly extending members being adapted to engage opposite ends of the coupling to hold it against inadvertent separation, said clamping means including a channel member receiving said extensions, a plate and bolt means for holding said extensions between said plate and said channel member.

4. A cord extension coupling clamp comprising a pair of members each formed of a single length of wire bent to provide a pair of parallel, unidirectional extensions, a leg extending upwardly from each of the extensions, a reversely turned wire portion extending from the upper end of each leg into partially overlying, parallel relationship with said extensions, and a downwardly extending, U-shaped line-receiving member joining said reversely turned portions, and clamping means for releasably engaging the extensions of each of said members in oppositely directed, longitudinally adjustable relationship, to maintain said reversely turned portions in adjustably spaced relation facing one another, to receive a coupling therebetween and then to be moved into overlying holding relationship therewith, said downwardly extending members being adapted to engage opposite ends of the coupling to hold it against inadvertent separation, the extensions of each of said pair of members being equally spaced to provide an interfitting, guided relation therebetween in said channel member.

5. A cord extension coupling clamp comprising a pair of members each formed of a single length of wire bent to provide a pair of parallel, unidirectional extensions, a leg extending upwardly from each of the extensions, a reversely turned wire portion extending from the upper end of each leg into partially overlying, parallel relationship with said extensions, and a downwardly extending, U-shaped line-receiving member joining said reversely turned portions, and clamping means for releasably engaging the extensions of each of said members in oppositely directed, longitudinally adjustable relationship, to maintain said reversely turned portions in adjustably spaced relation facing one another, to receive a coupling therebetween and then to be moved into overlying holding relationship therewith, said downwardly extending members being adapted to engage opposite ends of the coupling to hold it against inadvertent separation, the extensions of each of said pair of members being equally spaced to provide an interfitting, guided relation therebetween in said channel member, said channel member having upstanding sides with one of said sides slidably abutting one of the extensions of one of said pair of members and the other of said sides slidably abutting one of the extensions of the other of said pair of members.

References Cited in the file of this patent

UNITED STATES PATENTS

| | | |
|---|---|---|
| 812,287 | Nagel | Feb. 13, 1906 |
| 2,406,567 | Schueneman | Aug. 27, 1946 |
| 2,449,646 | Emde | Sept. 21, 1948 |
| 2,473,321 | Yanko | June 14, 1949 |
| 2,514,738 | Bradley | July 11, 1950 |
| 2,720,633 | Westberg | Oct. 11, 1955 |
| 2,721,313 | English | Oct. 18, 1955 |
| 2,761,109 | Hacker | Aug. 28, 1956 |
| 2,903,669 | Gilman et al. | Sept. 8, 1959 |